United States Patent

[11] 3,609,686

[72] Inventors Derek Alan Savory
Sutton, near Sandy;
Brian George Holland, Shefford, both of England

[21] Appl. No. 840,319
[22] Filed July 9, 1969
[45] Patented Sept. 28, 1971
[73] Assignee International Computers Limited
London, England
[32] Priority July 15, 1968
[33] Great Britain
[31] 33,564/68

[54] CHARACTER RECOGNITION SYSTEMS
8 Claims, 2 Drawing Figs.

[52] U.S. Cl. .......... 340/146.3 T
[51] Int. Cl. .......... G06k 9/10
[50] Field of Search .......... 340/146.3

[56] References Cited

UNITED STATES PATENTS

| | | | |
|---|---|---|---|
| 3,192,505 | 6/1965 | Rosenblatt | 340/146.3 T |
| 3,196,399 | 7/1965 | Kamensky et al. | 340/146.3 |
| 3,267,439 | 8/1966 | Bonner | 340/146.3 UX |
| 3,275,985 | 9/1966 | Dunn et al. | 340/146.3 |
| 3,333,248 | 7/1967 | Greenberg et al. | 340/146.3 UX |
| 3,341,814 | 9/1967 | Chow | 340/146.3 |

*Primary Examiner*—Maynard R. Wilbur
*Assistant Examiner*—William W. Cochran
*Attorney*—Hane & Baxley

ABSTRACT: A character recognition system, in which the outputs of individual photocells of a matrix are grouped together, is disclosed, Each group of outputs is applied through a detector to produce a group of binary signals which signals are applied as an input to an encoding device. Each encoding device has an output for each possible input signal from an associated group of photocell outputs, each encoding device output being connected to access a different location in a store. Each photocell group output accesses a different store location, a weighting function being stored in each store location. The weighting functions of sets of store locations in a set are summed and compared with the sums of other sets of store locations in order to identify an unknown character displayed to the photocell matrix.

INVENTORS
DEREK ALAN SAVORY
BRIAN GEORGE HOLLAND
BY Hane and Baxley
ATTORNEYS

CHARACTER RECOGNITION SYSTEMS

BACKGROUND OF THE INVENTION

The present invention relates to character recognition systems.

Systems for recognizing various fonts of printed characters are known and may employ several techniques, i.e. optical, magnetic, etc. for sensing portions of a character. It has been previously proposed to provide a matrix of sensing elements to sense areas overshadowed by a character and to produce binary signals in response to a particular character displayed to the matrix. In processing such signals, it has been found that the ability of a system to discriminate one character from another may be improved by weighting areas of the matrix. One such weighting technique includes the assigning of a probability number to each matrix position for a particular character to indicate the probability of say, a binary "1," existing in each matrix position. For example, if probabilities between zero and one are considered in a three-by-three matrix, a high probability such as 0.8 or 0.9 will appear in each matrix position of the middle column for a numeral 1 while a low probability, say 0.1 or 0.2, will appear in matrix positions of the first and third columns.

In weighting techniques of this type a sum of the probabilities of each "perfect" character is held as a reference and the sum of probabilities obtained from an unknown, and possibly degraded, character is compared with each reference sum to find the "best fit." The reference sum which is most closely approximated by the sum obtained by the unknown character is then provisionally chosen as the unknown character and may be subjected to still further tests. While accuracy of such a system may be improved by increasing the accuracy of probability values assigned to each area of the matrix, no one area is any more significant than any other area but for its weighting. Thus, where characters are similar, such as the numerals "3" and "8," the weighting pattern and sum of weightings of both characters may be highly similar. Therefore, it would be desirable if some added significance could be obtained by sensing areas of a matrix. A certain area or group of areas may be more significant in identifying a particular character or, more importantly, a variation of a character, than just a sum of probabilities or weightings. Also, certain areas or groups of areas may be highly significant in excluding possible characters. Thus, if a binary "1" is sensed in a certain position or matrix area, it may be much more significant in helping to recognize a numeral "8" and to exclude a numeral "3" than just comparing the respective sums of probabilities or weightings.

SUMMARY

According to the present invention a character recognition system using weighting techniques comprises means for providing a plurality of groups of outputs, each said output corresponding to whether or not a different individual area of a matrix of such areas is covered by a character, encoding means for energizing a predetermined different output line for each possible combination of said outputs in a said group, storage mans having a different set of storage locations for each possible character, each said output line serving when energized to access a predetermined different storage location of each set, each storage location serving to store a number based on how may times that location would be accessed for the corresponding possible character, and adder means for totaling the numbers accessed from each said set.

According to the present invention, there is provided a character recognition system in which the outputs of areas of a matrix are grouped together, the outputs being detected as binary signals. Each group of output signals is applied to an encoder which has an output line for each possible input signal. Thus if the areas (photocells) are arranged in groups of four, the encoder will have 16 outputs, each output being operable to select a different location in a store. By selecting a particular store location, the encoder output signal causes a weighting function stored therein to be read out.

An advantage of the present invention is that by grouping the photocell sensing areas together, certain group output signals, which are highly significant in recognizing particular characters, may be obtained. Such an output signal will then select a particular weighting function in the store. The invention therefore allows highly divergent, and easily distinguishable, weighting functions to be obtained for similar characters, and as such, provides a clear advantage over prior art systems.

Also, once a particular font of characters is chosen, the outputs of individual areas of the matrix may be grouped in such a manner as to aid in distinguishing particular characters, rather than randomly grouping such outputs.

BRIEF DESCRIPTION OF THE DRAWINGS

One embodiment of the invention will now be described with reference to the accompanying drawing, in which.

DESCRIPTION OF THE PREFERRED EMBODIMENT

Figure 1:
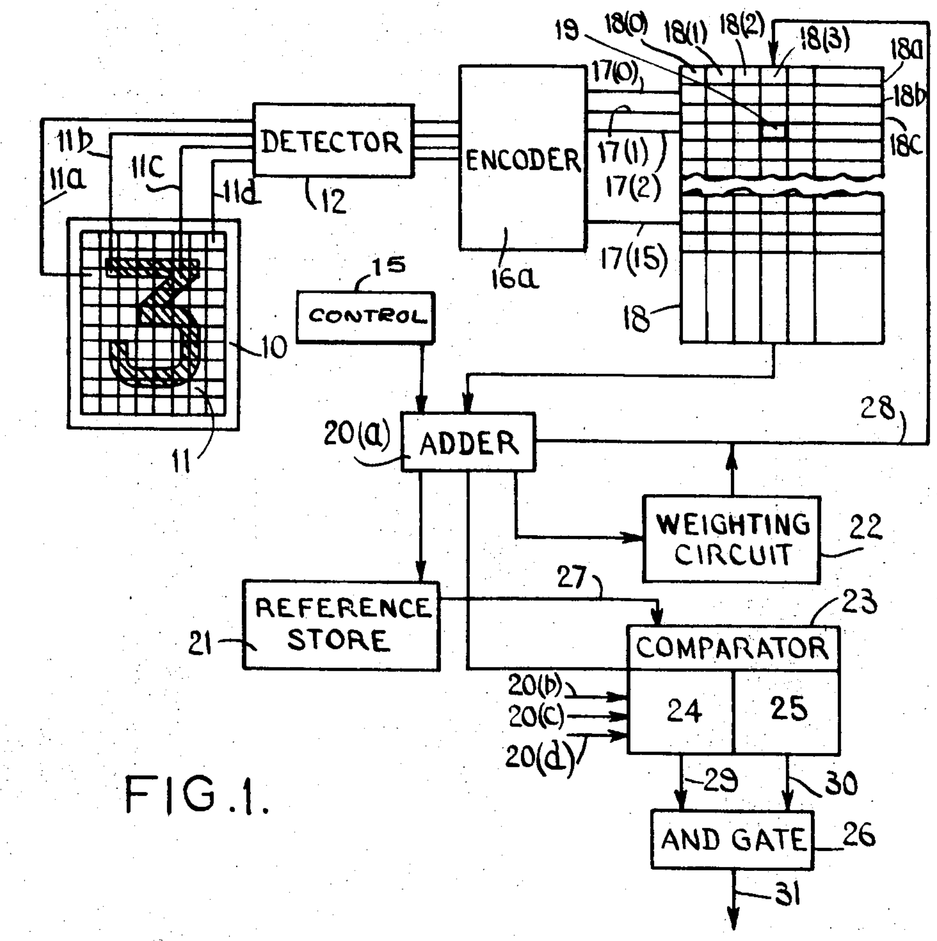
FIG. 1 diagrammatically shows an improved character recognition system.

Referring now to FIG. 1 of the drawings, a reading head 10 includes a mosaic of photocells 11. A group of conductors **11*a*–11 are randomly connected to four individual photocells in the mosaic. Although the conductors 11*a*–11*d* are shown superimposed over the photocells, it is cleat that such connections are made to the back of the mosaic. The output of each individual photocell will depend on whether the outline of a character overshadows that photocell. A detector 12** is provided to produce a binary digit "0" or "1" depending on whether or not a photocell is sufficiently overshadowed by a character. The convention to be adopted is that a binary "1" is produced when a photocell is so overshadowed and a binary "0" otherwise.

All photocells 11 are randomly grouped in groups of four and, by suitable means such as a detector 12, a binary "1" or "0" is produced by each photocell in a manner as described above. The detector output, a four bit binary signal, is applied to an encoder **16*a*, which in turn has 16 output lines, one line for each of the possible four bit combinations which may be produced. The encoder 16*a* is connected to store 18 with the encoder output representing the address of a word or "byte" in the store. Store 18 has a plurality of columns, shown diagrammatically as lines 18(0), 18(1).....etc. and a number of rows shown as 18*a*, 18*b***,... etc.

Before continuing the description of the elements of the system, the operation of the system will be considered. In brief, this operation includes the "teaching" of a character to the system, along with variations thereof, and then the testing of an unknown character. In order to teach a character to the system, each character outline is displayed in turn to the reading head 10. The outline of the character is carefully positioned with respect to some datum position, for example, the center of the mosaic, so that errors due to mispositioning are to a certain extent overcome.

Signals from the randomly chosen photocells are passed over lines **11*a*–11*d* through detector 12 to encoder 16*a*. At this time, a column in store 18 is selected. Assuming that a character "3" is being learned and control means selected, a corresponding column 18(3) for access, the selection being via an associated adder 20*a*. The output of encoder 16*a* operates to select or address a particular group of rows in store 18, the particular group of rows depending on the states of individual photocells of the group 11*a*–11*d*, each photocell being overshadowed by a character or not. The group of rows so accessed intersect column 18(3), the intersection shown diagrammatically by box 19. Thus, a signal from encoder 16*a* is passed to store 18 over one of lines 17(0), 17(1) etc., and selects or addresses a group of storage locations 19. This group of storage locations 19** may be termed a byte and, physically, may consist of a number of cores in a core store. In the present invention, it will be assumed that byte consists of four storage locations, although a byte may include as many storage locations as is necessary.

Initially, all bytes in store 18 are in a "0" state and when a byte such as byte 19 is accessed, a "1" is added into that byte by adder 20(*a*) over line 28. Each group of photocells produces an output signal which is applied through detector 12 to an encoder 16*b* 16*c*, etc. (not shown) and a corresponding byte is accessed.

As soon as the first outline of the character being taught to the system is "added" in, another outline of the same character is taught to the system with this latter outline varying in some way from the first outline. The reason for teaching several outlines of the same character to the system is that characters which are to be recognized are not always in perfect agreement with an "ideal" character. In order for the systems to be able to read such slightly varied characters, a number of possible variations are taught to the system. An example of such a variation in the present instance might be that the top horizontal portion of the character "3" is not in fact horizontal, but at some small angle, say 15°–25°. As a result of such a variation, some photocells of different groups not previously overshadowed, will be overshadowed, and vice versa. Since the character is still a "3," it is desirable to recognize the character as a "3" and for this reason, variations of the ideal character are taught to the system in order to recognize variations in unknown characters.

In an ideal situation in which there is no variation between the first and second outlines of a particular character, all bytes which were accessed by the first outline would be accessed by the second outline. However, since the characters are not of the same outline, some bytes will be accessed again by the second outline, other bytes will not and still other sites will be accessed for the first time. Upon accessing a byte for the second time, another "1" is added into that byte. Similarly, further variations in the character outline may be read into the system. Some bytes may be accessed by every variation read into the system, other bytes have been accessed by half of the bytes and still others, not at all.

It will be appreciated that the more times a particular byte is accessed, the more likely it is, that a photocell group which produces signals accessing such byte is sensing the character associated with the column containing the accessed byte. The number of times that a particular byte is accessed by various outlines of the same character will form a probability that if such byte is accessed by an unknown character, the greater is the likelihood that the unknown character is, in fact, the character corresponding to the column of the accessed byte.

Upon adding in or teaching as many variations of a character outline as desired, it is possible to total the contents of all bytes in a column by means of an adder 20(*a*) and to store this total in a reference store 21. However, rather than storing the byte contents directly, it has been found preferable to weight the contents of each byte by means of weighting circuit 22, sum the weighted contents in adder 20(*a*81 and store the weighted sum in reference store 21. Since it is necessary to add a "1"to each byte upon accession thereof, the weighting may be caused to operate only when all of the variations of a character outline are taught to the system.

One such weighting technique which may be employed is a 0–3 scale. The highest weighting given to a particular byte, that is the number of "1"s stored in it, is limited to the equivalent of three "1"s. The weighting of each byte determined by adder 20(*a*) totaling all of the "1"s added into it, rounding off all of these totals greater than seven to seven, dividing by two and again rounding off to the nearest whole number. Thus, with this technique, if a byte were accessed nine times with nine "1"s added in, a weighting of three would be produced for that byte location. Similarly, if a byte location were accessed five times as various outlines of a character are taught to the system, a weighting of two would be produced for that byte location.

Several circuits may be easily designed to accomplish the function of weighting circuit 22. For example, a simple decoder circuit may 13 employed since totals contained in adder 20(*a*) are in binary form. Thus, a decoder circuit which decodes the binary form of the number of times a byte is selected (left column of table 1) into the weighted value shown below (right column) would be satisfactory.

TABLE 1

| Number of times a byte is selected | Weighted Value |
|---|---|
| 7 (or more) | 3 |
| 6 | 3 |
| 5 | 2 |
| 4 | 2 |
| 3 | 1 |
| 2 | 1 |
| 1 | 0 |
| 0 | 0 |

As previously discussed, a byte will normally consist of four storage locations and will be capable of storing decimals ranging from 0–15 in binary form. Therefore, if more than sixteen variations of any character are to be taught to the system, it will be important to keep the proper weighted value in the byte or store location. If, for example, a total of 17 variations of the outline of the character "3" are to be taught to the system and a particular byte is selected by every outline, the contents of that byte will reflect a decimal "1" rather than a total of 17 as the byte can only contain 16 decimal figures at a maximum. Since the weighted value assigned to a byte containing a decimal "1" is zero, an incorrect weighting "result since any byte on seven or more times ought to contain a weighted value of three. Thus, it will be necessary to retain the proper weighted value, possibly in another store (not shown), if the number of outlines to be taught to the system exceeds the storage capacity of byte 19 in store 18.

A number of character are taught to the system in the same manner as the character "3" is taught. Similarly, each column of store 18 corresponds to a distinct character with the contents of bytes in each row weighted as described above.

The operation of recognizing a character will be referred to as the testing mode. In this mode, an outline of an unknown character is displayed to the reading head 10 as before with groups of photocells, such as group 11*a*–11*d* producing outputs in dependence upon whether individual photocells of the group are overshadowed by the unknown character. These outputs are applied by detector 12 as a binary input to encoder 16*a* such that one of output lines 17(0)–17(15) is energized to access a byte in dependence upon the states of individual photocells of the group 11*a*–11*d*. Similarly, each group of photocells produces an output signal which is encoded by a corresponding encoder with one output line of each encoder being thereby energized. Each encoder output line, such as lines 17())–17(15), accesses a byte within every column of the store. If, for example, line 17(2) is energized as the result of a particular input to encoder 16*a*, a byte in each of columns 18(0), 18(1), 18(2), etc. will be accessed and the weighting attributed to each byte so accessed will be applied to a corresponding adder. Thus, if we assume that line 17(2) accesses byte 19 in column 18(3), the weighting contained in byte 19 will be read out into adder 20*a*. Similarly, adder 20(*a*) will total the contents of all bytes in column 18(3) which have been accessed by the outputs of other encoders 16*b*, 16*c*, etc. (not shown) and will apply such a total to comparator 23. Also, the totals present in other adders 20(*b*), 20(*c*), 20(*d*), etc. (not shown) are applied to comparator 23, with the output of each such adder representing the weighted contents of bytes in a corresponding column.

Comparator 23 is comprised of two conventional comparator sections 24 and 25. Section 24 is a peak comparator and selects the greatest total from all of the adders 20(*a*), 20(*b*), 20(*c*), etc. while the corresponding column of the greatest total is provisionally chosen as representing the unknown character. Since the weightings contained in bytes of a column of store 18 reflect the number of times that the bytes have been accessed, the greater the total of weightings from bytes in a column, the greater the probability that the character corresponding to such column is in fact the unknown character presented for recognition.

Figure 2:
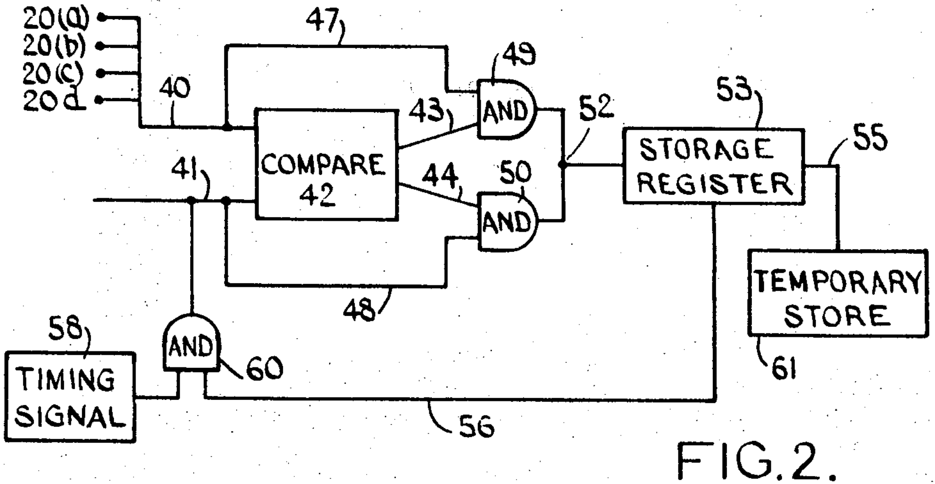
FIG. 2 diagrammatically shows a peak comparator of the present invention

A detailed version of a peak comparator 24 suitable for use in comparator 23 is shown in FIG. 2. This circuit includes first and second inputs 40 and 41, respectively, to a compare circuit 42. Totals stored in adders 20(*a*), 20(*b*), etc., may be applied to input 40. The inputs are also applied over lines 47 and 48 to AND gates 49 and 50 respectively, with output 43 of compare circuit 42 applied to AND gate 49 and output 44 applied to AND gate 50. Compare circuit 42 simply provides an output signal on line 43 if input 40 is greater than input 41 and vise versa with respect to line 44. The outputs of AND gates 49 and 50 are applied through a common point 52 to storage register 53 the contents of which are fed back to input 41 over line 56 through AND gate 60. Timing signal generator 58 is also connected to AND gate 60.

In operation, the contents of a first adder, say adder 20(*a*), will be read out and applied as input 40. Since storage register 53 is initially cleared, there will be a zero input on line 41 and compare circuit 42 will produce an output over line 43. This compare circuit output, in conjunction with input 40—the contents of adder 20(*a*)–will allow input 40 to pass over line 47 through AND gate 49 and be entered in storage register 53. At this point a new input, say the contents of adder 20(*b*) (not shown) are applied as input 40 and upon an appropriate signal produced by timing signal generator 58, AND gate 60 is opened to present the contents of storage register 53 as a second input 41. It will be realized that while the contents of register 53 are readout line 56, some means, such as a read-write circuit, will be provided to reenter the contents of adder 20(*a*) back into register 53. Similarly, a nondestructive readout technique may be employed to present the contents of register 53 as a properly timed input 41.

Now, a comparison between the contents of adders 20(*a*) and 20(*b*) is effected by compare circuit 42 and if the contents of adder 20(*b*) are greater than the contents of adder 20(*a*) a signal will be produced over line 43 allowing the contents of adder 20(*b*) to be entered into register 53 and thereby replacing the contents of adder 20(*a*) in register 53. The contents of each adder 20(*c*) 20(*d*), etc., (not shown) are sequentially compared with the contents of register 53 with the contents of 53 always being the greater of any two inputs applied over lines 40 and 41. Thus, upon presenting the contents of all adders sequentially over input line 40, the contents of storage register 53 will represent the greatest total in any of the adders. This greatest total may be read out of register 53 and held in temporary store 61. The process is then repeated with the contents of all adders, except the contents of the adder reflecting the greatest total, being compared sequentially to determine which contents are the second greatest, with these latter contents also read from register 53 and held in temporary store 61. The reasons for determining the second greatest total will subsequently be explained.

After provisionally selecting the greatest total of all the adders, the greatest total is compared with a total held in reference store 21, the latter total produced by summing weightings of various outlines of a character taught to the system, as described above. Upon making comparisons in sections 24 and 25, the system may be designed such that certain criteria will have to be met before the system actually recognizes the unknown character. These criteria will now be described.

As will be seen from the foregoing description, the recognition of a character depends on the total of weightings or "-score" it obtains when the pattern of bytes it accesses is compared with the pattern of bytes accessed by "known characters" taught to the system. In fact, due to the similarity of certain characters, for example "1" and "7" or "6" and "4" the system may have two fairly similar patterns and the unknown character may obtain a high total or "score" in both. To prevent the system from making a wrong decision, the recognition criteria built into it prevent the system from giving an output should the difference between the two highest scores be less than a particular percentage, say 20 percent. Peak comparator section 24 may be arranged such that an output is provided over line 29 only when the difference between the greatest total and next greatest total, both of which are held in temporary store 61, is such a particular percentage.

A similar criteria may be applied to comparator section 25. That is section may be controlled such that an output is produced on line 30 only when the greatest total produced by one of the adders 20(*a*), 20(*b*), etc., is a certain percentage of the total in reference store 21 (applied to comparator 23, over line 27). Such a suitable percentage of a maximum possible total that a "greatest total" must obtain, may, for example be 70 percent.

The outputs of comparator sections 24 and 25 are applied over lines 29 and 30, respectively, to AND gate 26. It will be appreciated that should the system fail to meet both of the above criteria, AND gate 26 will not produce an output over line 31 and the unknown character will not be recognized.

The store 18 has only been generally described as having columns and rows. Several types of stores, however, may be employed. For example, the store may be constructed of easily changeable N.D.R.O. (nondestructive readout) elements. This will permit patterns of weightings for different types of fonts to be stored in a separate memory device such as a magnetic tape, with the appropriate patterns being read into the store when characters in the relevant font are to be recognized. High frequency pulses may be employed to nondestructively read out contents of particular bytes.

Also, store 18 may be a conventional read-write core memory in which as the contents of bytes are read out into an adder such as adder 20(*a*), the contents are written back into the accessed byte by applying appropriate signals over line 28.

It will be realized that the weightings of the locations in the store could be calculated from abstract specifications of the characters to be recognized instead of being produced from teaching different character outlines to the system as described above. As a result of such calculations, a permanent (read only) memory pattern, will be set up prior to insertion into the store. With this type of memory, however, the pattern cannot be modified unless it is removed from the store.

Each character to be read by the system is carefully positioned with reference to the same datum position against which outlines of the characters being taught to the system were positioned. Also, an advantage of the system is that due to positioning of the photocells in each group, certain bytes within each column the store will not be accessed. The weightings of these particular bytes will remain zero so that the system will not saturate. Again, the position of the photocells within each group may not be randomly chosen, but may be selected with a view toward enhancing the distinction between characters on a particular font.

In another embodiment of the invention, the mosaic of photocells may be replaced by a single strip of photocells extending from the top to bottom of the characters. The character is scanned by this strip of photocells as the character passes in front of it, with the outputs of the photocells being read into a matrix of shift register. Once the whole character has be so scanned, the signals to be applied to encoders 16*a* etc., are taken from the matrix of shift registers.

We claim:

1. Character recognition system using weighting techniques, comprising means providing a plurality of groups of outputs, each said output corresponding to whether or not a different individual area of a matrix of such areas is covered by a character, encoding means for energizing a predetermined different output line for each possible combination of said outputs in a said group, storage means having a different set of storage locations for each possible character, each said output line serving when energized to access a predetermined different storage location of each set, each storage location serving to store a number based on how many times that location would be accessed for the corresponding possible character, and adder means for totaling the numbers accessed from each said set.

2. System according to claim 1, wherein said groups are randomly composed of equal numbers of outputs.

3. System according to claim 1, comprising control means operable in teaching particular possible character to the system for enabling for said access only that one of said set of storage locations that is to correspond to that possible character, said adder means being operable to add binary "1" to the contents of each storage location of said one set each time that location is accessed during said teaching.

4. System according to claim 3, further comprising weighting means connected to the adder means and the storage means and serving during said teaching to establish for storage in each storage location during character recognition, one of a plurality of predetermined numbers based on the actual contents of the storage location concerned.

5. System according to claim 4, further comprising a reference store for storing for each said set the total of the predetermined numbers for the constituent storage locations as determined for the corresponding taught character.

6. System according to claim 5, comprising a two-part comparator connected to the adder means and the reference store and operable during recognition of an unknown character, a first part of the comparator serving to determine from the adder means output which said set has the highest total of accessed predetermined numbers, and a second part of the comparator serving to compare said highest total with the contents of the reference store for the corresponding said set.

7. System according to claim 6, wherein the first part of the comparator is responsive to the second highest total being within a predetermined percentage of said highest total for causing said second highest total to be stored, the second part of the comparator then being operative for both the highest and second highest total.

8. System according to claim 7, wherein the second part of the comparator is operative to give an output indicating identification only if the total being compared exceeds a fixed percentage of the corresponding reference store contents.